March 6, 1945.  E. BÖHM  2,370,614
EXTRACTION APPARATUS
Filed July 17, 1942
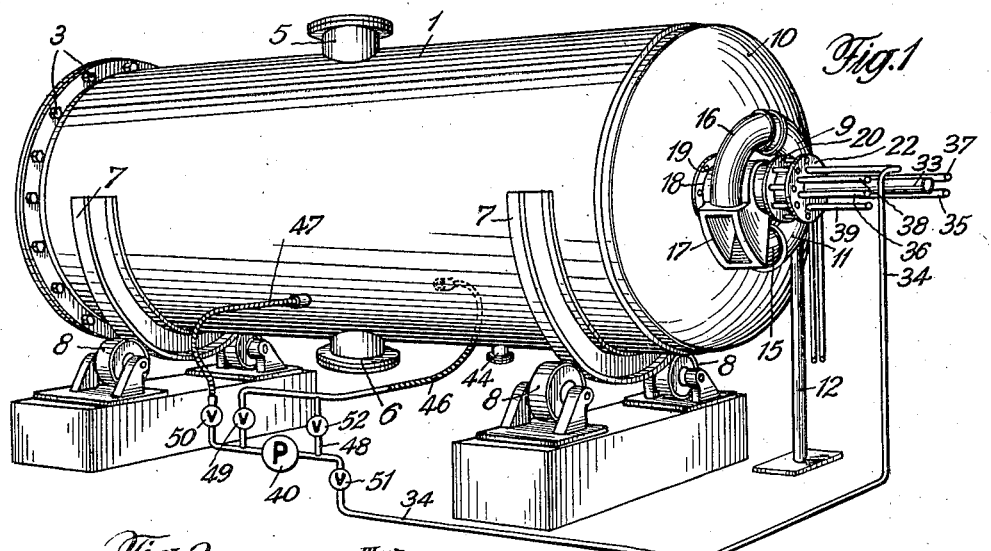
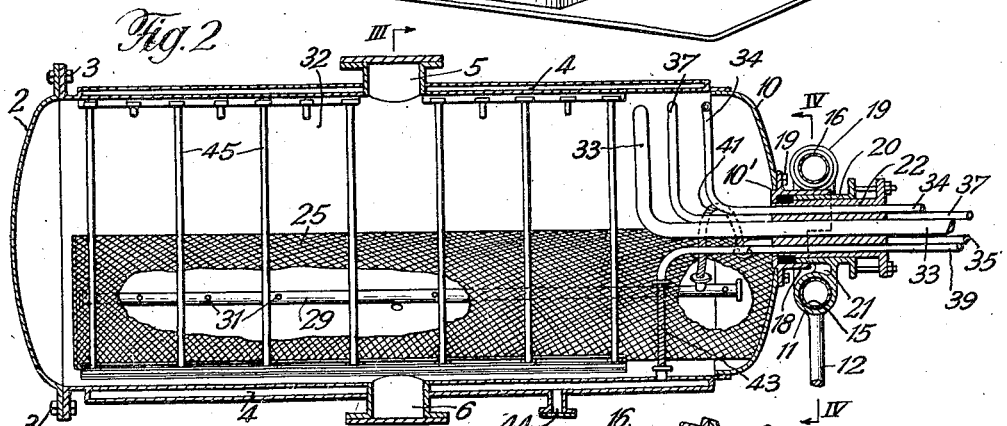
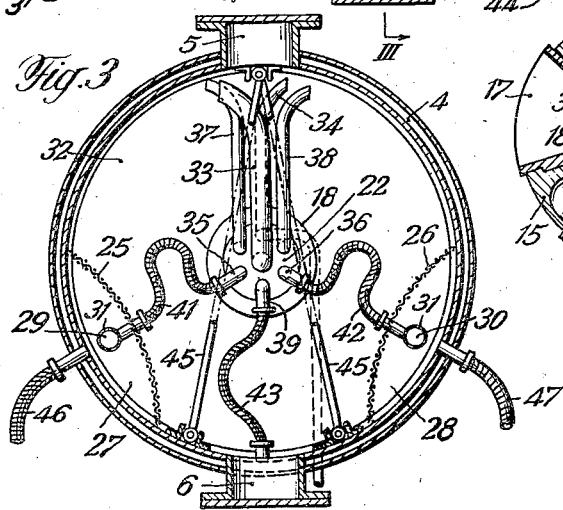
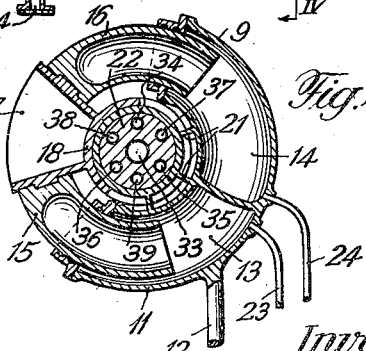
Inventor:
Egon Böhm
by Sommers & Young
Attorneys Patented Mar. 6, 1945

2,370,614

UNITED STATES PATENT OFFICE 2,370,614

EXTRACTION APPARATUS

Egon Böhm, Zurich, Switzerland, assignor to L. von Roll Aktiengesellschaft für kommunale Anlagen, Zurich, Switzerland Application July 17, 1942, Serial No. 451,377
In Germany November 13, 1940

5 Claims. (Cl. 23—269)

This invention relates to apparatus for extracting oils, fats, wax and the like from solid materials containing such soluble substances, by means of liquid solvents or vapors thereof.

There are known rotatable extraction vessels in which, owing to their rotary motion, the pipe conduits required to introduce steam and solvent during the movement of the vessel into the interior thereof, and the conduits serving for carrying away from the vessel vapors of the solvent, the mixture of extracted substances, or condensation water, must traverse the end walls of the vessel while being disposed concentrically to each other in the axis of rotation of the vessel. A portion of these conduits takes part in the movement of rotation of the vessel by being rigidly connected to the walls thereof, while other conduits remain stationary in the interior of the vessel, such as for instance the conduit for carrying away the vapors of solvent, which conduit must always have its entrance at the top portion of the vessel.

For this reason a rotatably movable vessel always requires a number of concentrically disposed stuffing boxes, which are the cause of a considerable frictional resistance against rotation of the vessel. Moreover, it is very difficult and practically impossible to dispose in a single end wall of the vessel a number of six to eight concentrical pipes disposed in the axis of rotation of the vessel. For this reason, in all known constructions of rotatable extraction vessels for oil or fat containing substances, both end walls are traversed by concentrical pipes, and both end walls thus form together with the side wall of the vessel a single closed compartment. This arrangement has the disadvantage that devices in the interior of the vessel, such as filtering and heating elements, are difficult to build in, and cannot be removed or exchanged when they are bigger than the usual man hole in the vessel.

In known rotatable extraction vessels, it is not possible to effect a continuous filtration during the movement of rotation, since the filtering elements obviously must emerge temporarily from the solution during a revolution of the vessel. For this reason a number of rotatable extracting vessels cannot be disposed in series as a battery with continuous flow of the solvent which is prefiltered in each vessel, as it is possible with upright extracting vessels.

The present invention relates to extraction apparatus comprising a horizontally disposed or slightly inclined rotatably mounted vessel which is preferably provided with filtering means in its interior. According to the invention a motor actuated driving device is connected to said vessel to impart oscillatory movement to the vessel about its longitudinal axis.

According to a preferred embodiment of the invention, one of the end walls of the cylindrical vessel comprises a central opening in which a cylindrical member is mounted by means of a stuffing box, said member being held stationary during the oscillatory movement of the vessel, and being perforated for insertion of a plurality of conduits leading into the interior of the vessel. Some of these conduits which do not take part in the oscillating movement of the vessel are rigidly connected with the member. Other conduits which have their inner ends rigidly connected to the wall of the oscillating vessel extend through said member. A portion of these latter conduits situated in the interior of the vessel is made flexible to provide for compensation for the varying distance between the stationary portion of these conduits traversing the member and the oscillating inner ends of the conduits. According to another embodiment the conduits which have their inner ends rigidly connected to the vessel extend through the wall of the vessel at any convenient place and portions of said conduits are made flexible so as to follow the oscillating movement of the vessel.

Preferably one of the end walls of the cylindrical vessel is free from any pipe connections, and this end wall is made removable, and for example connected by means of screws with the cylindrical wall of the vessel, in order to render the interior of the vessel accessible and permitting removal or exchange of filters and heating elements arranged within the vessel.

In order to obtain a thorough working and mixture of the contents of the extraction vessel, there are preferably provided two or more rows of inclined bars in the interior of the vessel, these bars being disposed in the shape of rakes and are oppositely inclined to form a roof-shaped structure disposed symmetrically to the longitudinal vertical plane through the axis of the vessel.

An obstruction of the filtering surfaces in the extraction vessel by residues can be removed during operation by pumping the solution which is present in the compartments formed between the filters and the wall of the vessel, from one compartment to the other under such pressure that the filtering surface is cleaned by the solution traversing it in a counter-stream.

The movement and continuous mixing of the solvent in the vessel not only is obtained by the filtering elements and the agitating bars moving with the vessel, but is still further increased by pumping the solvent from a compartment formed by a filtering element in a continuous stream back into the main compartment of the vessel.

The accompanying drawing represents by way of example a preferred embodiment of an extraction apparatus according to the invention.

Fig. 1 is a diagrammatic perspective view of the extraction apparatus.

Fig. 2 is a longitudinal section through the extraction vessel with its driving motor.

Fig. 3 is a transverse section along the line III—III of Fig. 2.

Fig. 4 is a transverse section of the driving motor along the line IV—IV of Fig. 2.

Referring to the drawing, a horizontally disposed or slightly inclined cylindrical vessel 1 is provided with an easily removable end wall or cover 2 secured by screws 3 to the cylindrical wall of the vessel. The cylindrical wall is provided with a heating jacket 4 which is connected to a steam supply for indirect heating of the contents of the vessel. An opening 5 in the top of the vessel serves for charging the vessel with the material to be subjected to extraction. 6 is the discharge opening. The cylindrical vessel 1 is supported by the intermediary of curved rails 7 on rollers 8 permitting the vessel to effect an oscillatory to-and-fro movement about its longitudinal axis.

The oscillatory movement of the extraction vessel 1 is effected by a hydraulically operated rotary piston motor 9 having its rotor connected to the end wall 10 of the vessel. This motor comprises a stationary housing 11 maintained in its position by a pillar 12 which is secured to the floor. The housing 11 forms two circularly curved cylinders 13 and 14 in each of which a piston 15 and 16, respectively, can reciprocate. Both pistons are connected to a crank member 17 formed on a driving sleeve 18 which is secured to the end wall 10 of the vessel 1 by means of screws 19. The sleeve 18 is rotatably mounted on a stationary hub 20 integral with the motor housing 11 by means of ribs 21. The members 18 and 20 form a stuffing box surrounding a cylindrical plug member 22 the inner end of which penetrates into a central hole 10' provided in the end wall 10 of the vessel 1. Conduits 23 and 24 serve to alternately feed pressure water to the cylinders 13 and 14 and to discharge water therefrom. Instead of pressure water, steam may be used as driving fluid. Any known distribution means, not represented, are provided to control the flow of driving fluid in the conduits 23 and 24, so that fluid enters through one of the conduits into one of the cylinders and discharges from the other cylinder through the other conduit, until the pistons arrive at the end of their stroke, when the flow of the driving fluid is reversed in the conduits 23 and 24 to move the pistons 15 and 16 in opposite direction. The movement of the pistons is transmitted by the agency of the crank member 17 and sleeve 18 to the vessel 1 which thus effects an oscillatory movement.

The stationary plug member 22 is perforated in axial direction and traversed by a plurality of conduits leading into the interior of the vessel. Within the vessel there are provided two filtering elements 25 and 26 disposed on both sides of the vertical axial plane of the vessel when it is in its normal position of rest and extending over substantially the entire length of the vessel. Between each filtering element 25 and 26 and the cylindrical wall of the vessel a compartment 27 and 28, respectively, is formed which receives the filtered solution. Within each of the two compartments a pipe 29 and 30, respectively, extends longitudinally thereof and is provided with a number of openings 31. The filtering elements 25 and 26 are removably secured in the vessel and can be withdrawn therefrom when the cover 2 is opened.

The conduits traversing the stationary plug member 22 comprise a central conduit 33 serving for withdrawal of solvent vapors from the main compartment 32 of the vessel 1. A conduit 34 is connected to a pump 40 and has its end traversing the plug 22 open into the main compartment 32 of the vessel. Two conduits 35 and 36 traversing the plug 22 are connected within the vessel by means of flexible tubes 41 and 42 to the pipes 29 and 30, respectively, extending longitudinally of the filter compartments 27 and 28. A further conduit 37 opening into the main compartment 32 is used to blow steam into the interior of the vessel. The conduit 38 serves to introduce solvent into the vessel, and the conduit 39 is connected within the vessel by means of a flexible tube 43 to the heating jacket 4 to deliver steam to the jacket. An opening 44 in the jacket 4 serves to drain condensation water. In the interior of the vessel are disposed two rake-shaped structures composed of inclined bars 45. These bars are rigidly connected to the internal wall of the vessel and disposed symmetrically with respect to the vertical axial plane of the vessel and accordingly to the median plane of oscillatory movement thereof. When the vessel effects its oscillatory movement, the contents of the vessel are thoroughly agitated and mixed by the rake bars 45 moving with the vessel.

One side of the pump 40 is connected to two flexible conduits 46 and 47 which lead into the filter compartments 28 and 29, respectively. The other side of the pump is connected to the conduit 34 and by means of a tube 48 also to the flexible conduit 46. The conduits 46 and 47 are provided with valves 49 and 50 respectively, the conduit 34 is provided with a valve 51 and the tube 48 also comprises a valve 52. When closing the valve 52 and opening the valves 49, 50 and 51, the pump 40 can draw solution from the compartments 27 and 28 through the conduits 46 and 47 and deliver it through the conduit 34 into the main compartment 32 of the vessel. When the valves 49 and 51 are closed and the valves 50 and 52 are opened the pump can draw filtered solution from the compartment 27 and deliver it to the compartment 28, or vice versa.

The operation of the described apparatus is as follows: When the vessel is in its position of rest as represented in Figs. 1 to 3, it may be partly filled through the opening 5 with the material to be subjected to extraction. Afterwards a suitable amount of solvent is introduced through the conduit 38 and then this conduit is closed. Now steam is introduced into the heating jacket 4 through the conduit 39 and tube 43 and at the same time the driving motor 9 is started to impart oscillating movement to the vessel. The pump 40 is also started with the valves 49, 50 and 51 open and the valve 52 closed, so that solvent is drawn from the compartments 27 and 28 and delivered into the main compartment 32 of the vessel. Owing to the oscillating movement of the rake bars 45, a thorough mixture of the contents of the vessel is effected which acts to accelerate the extraction process. When during the extraction process the filtering elements become clogged up by residues and the filtering capacity is reduced, the valves 49 and 51 are closed and the valves 50 and 52 opened, so that the pump 40 draws solvent from one of the compartments 27 or 28 and delivers it to the other compartment; the pump is in this case made to work alternately in opposed directions, so that liquid is urged under pressure in a counterstream from below through the filtering elements 25 and 26 to effect a cleaning of the filtering surfaces and removal of the residues deposited on them. As soon as the filtering surfaces are properly working again, the valve 52 is closed again and the valve 51 opened together with the valves 49 and 50 so that the circulation of the solvent from the compartments 27 and 28 to the main compartment 32 is reestablished.

When the extraction of the contents of the vessel is terminated the solution is withdrawn by suction through the conduits 35 and 36 communicating with the pipes 29 and 30 in the filter compartments 27 and 28, while the oscillatory movement of the vessel is maintained. When necessary the extraction may be repeated in the described manner by introducing fresh solvent into the vessel. After withdrawal of the solution the vapors of the solvent are withdrawn through the conduit 33, also during constant oscillatory movement of the vessel, and the last traces of solvent are forced out by blowing steam into the vessel through the conduit 37. When all the solvent has been removed, the discharge opening 6 will be opened and during continuous oscillatory movement of the vessel the contents thereof which are free from oil and solvent are discharged.

Although I have shown a particular preferred embodiment of my improved extraction apparatus for oils, fats, wax and the like, I do not desire my invention to be limited to the particular arrangements disclosed, as various changes and modifications in the arrangement, disposition and form of the parts can be made without departing from the principle of the present invention as comprehended within the scope of the appended claims.

I claim:

1. Extraction apparatus comprising a substantially horizontally disposed rotatably mounted cylindrical extraction vessel, said vessel having one end wall removably secured to the cylindrical wall of the vessel, and a rotary piston motor having a rotor means operatively connecting the rotor to the opposite end wall of the vessel, said connecting means being so constructed as to impart oscillatory movement to the vessel about the longitudinal axis thereof.

2. Extraction apparatus comprising a substantially horizontally disposed rotatably mounted cylindrical extraction vessel, a plurality of conduits leading into the vessel through one end wall thereof, the opposite end wall of the vessel being free of openings for conduits and being removably secured to the cylindrical wall of the vessel, and a rotary piston motor having its rotor mounted coaxially with the longitudinal axis of said vessel, means operatively connecting said rotor with the end wall traversed by the conduits, said connecting means being so constructed as to impart oscillatory movement to the vessel about the longitudinal axis thereof.

3. Extraction apparatus comprising a substantially horizontally disposed rotatably mounted cylindrical extraction vessel, one end wall of the vessel being provided with a central opening, a stationary plug member disposed in said opening, a stuffing box surrounding said plug member, a plurality of conduits traversing the plug member to lead into the interior of the vessel, the opposite end wall of the vessel being removably secured to the cylindrical wall of the vessel, and a rotary piston motor having a rotor mounted coaxially with the longitudinal axis of the vessel and disposed around said stationary plug member, means for operatively connecting said rotor to said first mentioned end wall of the vessel, said connecting means being so constructed as to impart oscillatory movement to the vessel about the longitudinal axis thereof.

4. Extraction apparatus for extracting oils, fats, wax and the like from solid substances by means of liquid solvents or vapors thereof, said apparatus comprising a substantially horizontally disposed rotatably mounted cylindrical extraction vessel having a removable end wall, the opposite end wall being provided with a central opening, a driving motor, means for operatively connecting said motor with said vessel, said connecting means being so constructed as to impart oscillatory movement to the vessel about the longitudinal axis thereof, a stationary plug member disposed in said opening, a plurality of conduits traversing said plug member to lead into the interior of the vessel, two filtering elements disposed within the vessel and extending over substantially the entire length of the vessel, each of said filtering elements defining with a portion of the wall of the vessel a compartment adapted to receive the filtered solution, a reversible pump, and flexible tubes connecting one side of the pump to one of said compartments and the other side of the pump to the other compartment whereby solvent may be alternately forced in opposed direction through said compartments during the oscillatory movement of the vessel.

5. Extraction apparatus for extracting oils, fats, wax and the like from solid substances by means of liquid solvents or vapors thereof, said apparatus comprising a substantially horizontally disposed rotatably mounted cylindrical extraction vessel having a removable end wall, the opposite end wall being provided with a central opening, a reciprocatory piston type motor, means for operatively connecting said motor with said vessel, said connecting means being so constructed as to impart oscillatory movement to the vessel about the longitudinal axis thereof, a stationary plug member disposed in said opening in the end wall, a plurality of conduits traversing said plug member to lead into the interior of the vessel, said removable end wall being free of openings for conduits, two filtering elements disposed within the vessel and dividing the vessel in two filter compartments and a main compartment, a pump having its delivery side connected to one of said conduits leading into the vessel, and flexible tubes connecting the suction side of the pump to said filter compartments whereby a continuous circulation of solvent is maintained between said filter compartments and the main compartments during oscillatory movement of the extraction vessel.

EGON BÖHM.